US012547756B2

(12) United States Patent
Alex Namasivayam et al.

(10) Patent No.: US 12,547,756 B2
(45) Date of Patent: Feb. 10, 2026

(54) SYSTEMS AND METHODS FOR SECURE DATA STORAGE

(71) Applicant: Roche Diagnostics Operations, Inc., Indianapolis, IN (US)

(72) Inventors: Aishwarya Alex Namasivayam, Gemmrigheim (DE); Jochen Britz, Ottweiler (DE); Stefan Bucheli, Lucerne (CH); Ricardo Cristino, Tamm (DE); Stanislaw Findeisen, Winturthur (CH); Alper Kocademir, Zurich (CH); Sudipto Shekhar Roy, Stuttgart (DE); Gerhard Sonnenberg, Saarbruecken (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 90 days.

(21) Appl. No.: 18/618,670

(22) Filed: Mar. 27, 2024

(65) Prior Publication Data
US 2024/0346171 A1 Oct. 17, 2024

(51) Int. Cl.
*G06F 21/62* (2013.01)
(52) U.S. Cl.
CPC .............................. *G06F 21/6227* (2013.01)
(58) Field of Classification Search
CPC ............. G06F 21/6227; G06F 21/6254; G06F 16/2228; G06F 16/2433; G06F 16/284; G06F 21/602; G06F 21/6245; G06F 3/062; G16H 40/67; G16H 10/60
See application file for complete search history.

(56) References Cited

U.S. PATENT DOCUMENTS

| 10,572,684 | B2 | 2/2020 | Lafever et al. |
| 11,977,659 | B2 | 5/2024 | Ninglekhu et al. |
| 12,333,041 | B1 * | 6/2025 | Rahman .............. G06F 21/6227 |
| 2015/0235049 | A1 | 8/2015 | Cohen et al. |

FOREIGN PATENT DOCUMENTS

| EP | 2656274 B1 | 3/2019 |
| WO | 2001/033936 A2 | 5/2001 |

* cited by examiner

*Primary Examiner* — Izunna Okeke
(74) *Attorney, Agent, or Firm* — Lee & Hayes, P.C.

(57) ABSTRACT

A system for securely storing data, such as sensitive personal data, including an interface configured with a REST API, an authentication module, at least one target database for storing the data, and a data access module which is configured to receive requests from a client computer by means of the interface, query data from the at least one target database in response to the received request, determine whether the client computer and/or the user has permission to query, and generate a response data set to respond to the request and transmit it to the client computer, wherein at least some data of the response data set is anonymised if restricted authentication is determined.

15 Claims, 3 Drawing Sheets

SYSTEMS AND METHODS FOR SECURE DATA STORAGE

CROSS-REFERENCE TO RELATED APPLICATIONS

This application claims priority to German Patent Application No. 102023109178.6, filed Apr. 12, 2023, the disclosure of which is hereby incorporated by reference in its entirety.

SUMMARY

Some embodiments include a system for storing data, comprising an interface, an authentication module, at least one target database and at least one data access module. Furthermore, some embodiments relate to a method for storing corresponding data by means of a corresponding system.

In the medical sector, storing data is highly problematic. The data in question is often personal and very sensitive. At the same time, there is a need for corresponding data to be available for various groups of people and applications. Reliable data is required for making an accurate diagnosis of diseases and also for their subsequent successful treatment. The further development of medical algorithms also requires data to be available, in particular over the long term.

Comprehensive systems are therefore being developed in the healthcare sector that make the relevant data available, in particular personal data.

The management of such personal data is complex, as there are different rules and laws for handling this data. These rules and laws relate to the form of storage, its retention period and its use for different purposes.

Furthermore, the connection of different applications to such systems for storing data is complex. In many of the existing applications and systems, attempts are made to implement the necessary algorithms for compliance with data protection locally—i.e., in the respective application—wherein this approach is very complex. Newer systems rely on central data management, wherein the connection of existing applications is technically complex. Here it is often necessary for the existing applications to be completely re-implemented.

U.S. Pat. No. 10,572,684 B2 describes a system in which personal data is stored in a distributed database, preferably in a blockchain. EP 1 226 524 A2 describes a system in which data can be shared between entities. With this system it is also possible to release data for the healthcare system, wherein data security is guaranteed by means of encryption and appropriate certificates.

EP 2 656 274 B1 describes a system for exchanging or making documents available. The system implements an access restriction that allows for personal data to be protected.

Proceeding from this prior art, it is the object of the present invention to create an efficient and secure system for storing data. In particular, the system should make it possible to integrate existing applications easily and efficiently.

The object is achieved by a system according to Claim 1 and by a method according to Claim 13.

In particular, the object is achieved by a system for storing data, in particular personal data, which includes:
- an interface, in particular a representational state transfer (REST) application programming interface (API);
- an authentication module;
- at least one target database for storing the data;
- a data access module, configured to
  - a) receive requests from a client computer by means of the interface;
  - b) query data from the at least one target database in response to the received request;
  - c) determine whether the client computer and/or the user has permission to query; and
  - d) generate a response data set to respond to the request and to transmit it to the client computer, wherein at least some data of the response data set is anonymised if restricted permission is determined.

One idea of the present invention is to store the data in (central) target databases. The target databases have a (central-) upstream data access module that manages access to the data. The authentication module regulates which application can access which data. With some embodiments it is therefore no longer possible for applications to access the data directly. Instead, access must take place via the data access module, which receives requests, for example from client computers, via a preferably predefined interface. The requested data can then be queried at least partially from the target databases. As already explained, it is verified whether and to what extent there is permission to access the queried or requested data. A corresponding access regulation can be based on accounts representing users and/or roles and/or devices, wherein it is possible for individual applications to be assigned user accounts, as is customary in common operating systems. According to some embodiments, other known authentication concepts are also conceivable.

In order to respond to the request, the data access module is configured according to some embodiments to generate a response data set and to transmit this to the client computer, wherein individual pieces of data in the response data set are anonymised. A corresponding anonymisation can be effected online—e.g., at the time of the query—or offline—at a time before the request, for example when collecting the data or as part of a nightly routine.

In some embodiments, the interface used to query and/or provide the data is a REST ("representational state transfer") based interface. A corresponding REST API can be implemented as a web service and enables requests to be processed efficiently.

In some embodiments, a system comprises a database driver, installed in particular on at least one client computer, which is configured to communicate with the interface. A corresponding database driver can be a Java database connectivity (JDBC) driver. Highly sophisticated database access modules exist on many of the existing operating systems. Many of these database access modules are Open Database Connectivity (ODBC) based. Thus, applications on client computers do not access the data source directly, but use installed ODBC drivers to implement appropriate access. Compared to traditional ODBC drivers, REST APIs are relatively new. Some embodiments include ODBC drivers, in particular JDBC drivers, which enable applications to communicate with the interface of systems described herein. Their access to the system is thus clearly structured and existing applications can communicate with the system by means of the ODBC driver or JDBC driver. The outlay for a migration is therefore extremely low, in particular when you consider that a system according to some embodiments can behave like a conventional target database despite the additional functionalities of the authentication and data access modules.

In some embodiments, the database access module comprises a parser unit that is configured to receive a character string with an SQL expression and to extract field names from the SQL expression. Configurations can still be applied to the SQL query in the database access module.

It is possible to implement the database driver in such a way that it largely automatically translates an SQL request into a request that is transmitted to the interface. For example, in some embodiments, the SQL request is translated into a request that conforms to a REST standard. In some embodiments, a parser unit is used for this, which, for example, extracts table names and/or column names from the SQL expression or the ODBC request. This data can be used to create specific data requests via the interface. For example, a GET request can be sent via HTTP, in which the table names and/or column names address the resource to be queried.

In one (further) embodiment, the SQL request is encapsulated as a character string in a REST request or REST call that is sent to the interface.

In some embodiments, a system comprises a database storing accounts representing a plurality of roles and/or particular users, wherein permissions are assigned to each of the roles/users. It is possible to use the authentication concept of the individual target databases in order to enable the system, in particular the authentication module, to manage access. In a preferred embodiment, a (separate) database is used to manage accounts representing roles and/or users across target databases and to assign permissions to them.

The authentication module can be configured to assign at least a selection of requests received by means of the interface to at least one role or user from the database and, based on the assigned permission, to determine which data are transmitted in response to the respective request by means of the interface.

In some embodiments, the authentication module may decide to deny a user or role access to certain data altogether. In one (further) embodiment, the permissions affect which target database and/or which subcomponents (e.g., tables and/or views) of a particular target database are queried. According to some embodiments, it is also possible for at least one anonymisation function to be selected, based on the permission, in order to anonymise specific data from a target database (online).

In some embodiments, the system, in particular a configuration management module, is configured to generate and store target databases and/or views (e.g., so-called SQL views) for different users and/or roles depending on predefined and/or assigned permissions. In some embodiments, there are multiple target databases and/or views for an original data set, wherein the individual target databases and/or views differ in that they are anonymised to different extents. For example, a first view can output the data originally recorded by the configuration management module, while a second view shows only part of the originally recorded data, wherein data sets have been removed and/or entries have been anonymised, for example.

Offline anonymisation is therefore carried out in some embodiments, wherein the data is possibly duplicated or output differently on the basis of different views. This approach has the advantage that requests can be responded to very efficiently. It is also possible to record and thus document the states and thus the different degrees of anonymisation of the individual tables/views/fields.

As already explained, a system can be configured to select a target database from a plurality of target databases for requests on the interface, which database contains the data for responding to the request.

In some embodiments, the authentication module is configured to
 a) assign a role and/or a user to the request;
 b) determine whether the target database is a relational database; and
 c) if the target database is a relational database, use the role or information about the user to select a view from a plurality of views;
 d) use the selected view to respond to the request.

The use of views has the advantage that, at least with regard to SQL databases, the data is not duplicated at will, while an effective access concept can be implemented at the same time.

In some embodiments, a system, in particular the configuration management module, is configured to generate and store copies for different users and/or roles for a (distributed) target hash database, which is used as the target database, depending on predefined and/or assigned permissions. The copy hash databases created in this way can have different degrees of anonymisation, comparable to the views or SQL tables already explained.

In some embodiments, there is a correlation between different permissions and different target hash databases. In some embodiments, there are correlations between different roles and the copy hash databases. These are therefore role-specific copies.

A non-SQL-based database is referred to as a hash database within the meaning of the present invention. This can be a database that stores key-value pairs. The hash database may be a distributed database such as Amazon's DynamoDB®. Corresponding hash databases are highly performant in terms of responding to requests. This performance is not affected by the creation of the copies. The performance of the system can be further increased by skillfully distributing the individual copies to different servers.

In some embodiments, a system is configured to select a target database from a plurality of target databases for requests on the interface, which database contains the data for responding to the request. In this context, the authentication module can also be configured to:
 a) assign a role and/or a user to the request;
 b) determine whether the target database is a hash database; and
 c) if the target database is a hash database, use the role or information about the user to select a copy hash database from a plurality of copy hash databases to be used to respond to the request.

In some embodiments, SQL databases and non-SQL databases, in particular hash databases, coexist in parallel. In this context, the anonymisation of the SQL databases takes place according to different approaches. For example, the SQL databases can be made anonymous by providing different views and the non-SQL databases by duplicating individual data (cf. copy hash databases). The system knows at least these two anonymisation approaches and, when responding to a request, determines the entity (view or copy) that is to be used with the given permission. Thus, despite the necessary anonymisation, different database implementations can be used. In particular, the different database implementations may be tailored to how the data can be stored and queried most efficiently. The necessary data protection can thus be implemented independently of the specific implementation of the respective database. The specific technology used to implement the respective databases is not transparent for external access (via the interfaces) so that uniform access can take place.

In some embodiments, a system comprises a data collection context module that is configured to store data collection context for at least one selection of data sets on the at least one target database. The data collection context can be, for example, a time when the data was collected, an objective of the data collection, a data retention period, a legal basis for the data collection, information on associated retention policies, etc. By determining the data collection context, it is possible to initiate different forms of anonymisation based on this data. Partially or fully automated retention policies can also be implemented for individual data. For this purpose, the system, in particular the configuration management module, can be configured to select data based on the data collection context and to store the selected data in an anonymised form.

In some embodiments, at least some of the data of at least one target database is encrypted, wherein the system is configured to receive a security token and, based on the security token, to determine whether the client computer issuing the query is authorized to communicate with the system and/or to receive the queried data. A key database can be provided for this purpose, wherein the system is configured to use the key database to select a key which is used to decrypt encrypted data, in particular from the at least one target database.

A system according to some embodiments can thus also perform a key management function, wherein a querying client-computer/user is authenticated on the system and the system selects keys for access to individual encryption data in the target databases depending on its own authentication concept. By means of the driver described above and the system according to the invention, it is thus also possible to implement an authentication system for older applications running on the client computers, which is implemented uniformly across all access requests.

Some embodiments include a method for responding to at least one request by means of a response data set, wherein the method comprises the following:
  a) receiving at least one request via an interface, in particular a REST API;
  b) querying data from at least one target database in response to the received request;
  c) determining whether the client computer and/or the user has permission to query; and
  d) transmitting at least one response data set to respond to the request, wherein at least some data of the response data set is anonymised if restricted permission is determined.

Some embodiments are achieved by a computer-readable memory containing instructions for implementing method described herein, in particular when the instructions are executed on at least one processing unit. Here, too, there are advantages similar to those already described in connection with systems according to some embodiments.

Further advantageous embodiments are obtained from the dependent claims.

BRIEF DESCRIPTION OF THE DRAWINGS

Aspects of the disclosure are described below by means of several exemplary embodiments, which are explained in more detail with reference to illustrations. In the figures.

DETAILED DESCRIPTION

Figure 1:
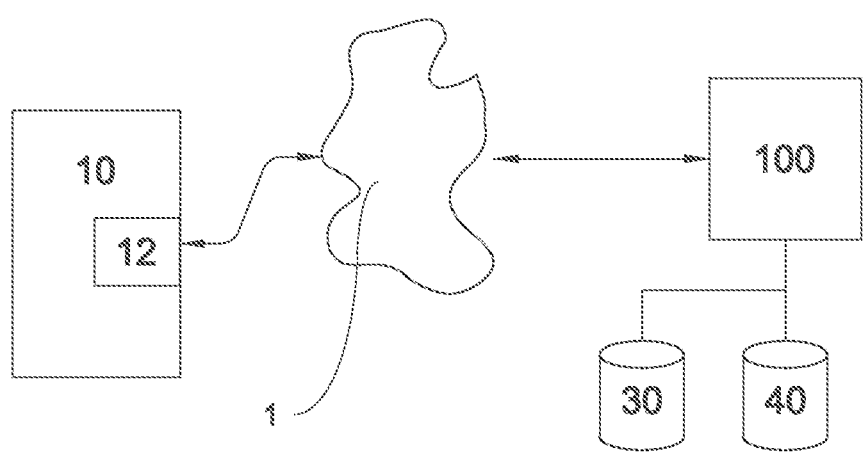
FIG. 1 shows a schematic representation of the system according to some embodiments, which is communicatively connected to a client computer via the Internet.

FIG. 1 shows a client computer 10 which is communicatively connected to an exemplary embodiment of the system 100 according to some embodiments via the Internet 1. In the level of abstraction shown, the system 100 comprises a relational database 30 and a hash database, for example a DynamoDB® database by Amazon.

Different applications can be installed on the client computer 10, which usually communicates with a database via an ODBC interface. In the exemplary embodiment shown, a database driver 12 is provided, which enables the applications to communicate with a REST API 105 (cf. FIG. 2) of the system 100 via a JDBC driver.

Figure 2:
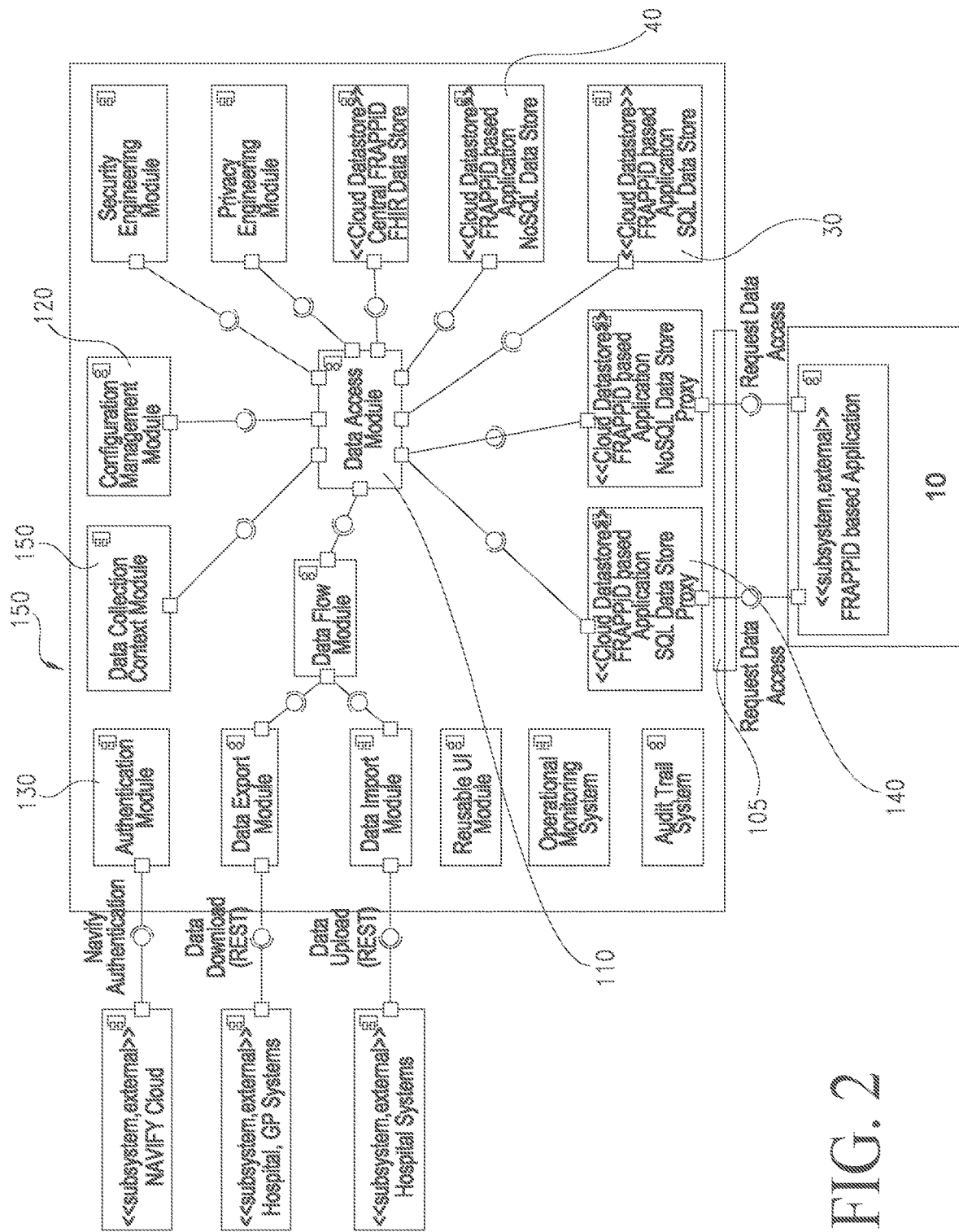
FIG. 2 shows a detailed schematic illustration of the system according to some embodiments according to FIG. 1.

FIG. 2 shows the system 100, wherein some software components are highlighted schematically. These software components comprise:

| Component name | Component description |
| --- | --- |
| Data Import Module | Component responsible for supporting: authentication of external data suppliers (e.g., hospital systems) encryption of data provided by external data providers receiving and storing data provided by external data providers |
| Data Export Module | Component responsible for supporting: authentication of the external systems to which data is made available the encryption of data made available to external systems, provision of persisted data for external systems |
| Data Flow Module | Component which is responsible for: the execution of data flows between different data stores supporting configurability of such data flows, where applicable supporting operational monitoring and management of such data flows This component manages data flows between the following data stores: data stores used by the data import module data stores used by the data export module SQL database hash database |
| Data Access Module | Component that implements data access and supports anonymisation. This component accesses data by sequentially performing the same steps over and over, in some embodiments, taking into account the following points: data collection context of data access data authentication, security and privacy configurations of data access security logic to be applied to data access data protection technology logic to be applied to data access audit trails to be used for data access physical data access operations for SQL and hash databases This component delegates much of its functionality to the appropriate modules via its defined endpoints. |

| Component name | Component description |
|---|---|
| SQL Database Proxy (FRAPPiD based Application SQL Data Store Proxy) | Component that intercepts calls to SQL database to route data access through Data Access Module logic. This component can create client-side dependencies (e.g., libraries, packages, modules) required for the supported runtimes (e.g., JVM, .NET, Python) and operating systems (e.g., Windows ".dll", Linux ".so", ".a"). |
| Non-SQL Database Proxy (FRAPPiD based Application NoSQL Data Store Proxy) | Component that intercepts calls to non-SQL databases to route data access through Data Access Module logic. This component can create client-side dependencies (e.g., libraries, packages, modules) required for the supported runtimes (e.g., JVM, .NET, Python) and operating systems (e.g., Windows ".dll", Linux ".so", ".a"). |
| SQL Database (FRAPPiD based Application SQL Data Store) | Component that stores data from applications in one of the supported SQL data stores. This component is accessed almost exclusively via the Data Access Module. |
| Hash Database (FRAPPiD based Application NoSQL Data Store) | Component that stores data from applications in one of the supported non-SQL data stores, such as a hash database. In some embodiments, this component is accessed (almost) exclusively via the Data Access Module. |
| Data Collection Context Module | Component which is responsible for providing: data collection context management UI to manage the data collection context data persistence of data collection context information The legal basis for data collection may comprise, but is not limited to: data attributes related to the consent of the data subject data attributes related to the data processing agreement with the data controller data attributes related to a legal obligation that requires data collection data attributes related to the vital interests of the data subject data attributes related to public interest |
| Configuration Management Module | Component which is responsible for providing: application configuration via defined endpoints UI for maintaining application configuration data API for maintaining application configuration data persistence of application configuration data |
| Authentication Module | Component which is responsible for: execution of additional authentication with authentication factors (e.g., client certificates, one-time passwords, push notifications, confirmation emails, notification emails, security questions) managing, issuing, deploying, verifying these additional authentication factors |
| Security Engineering Module | Component which is responsible for providing: wrapper for supported encryption methods over defined endpoints wrapper for supported hashing methods over defined endpoints functionality for managing, providing and applying encryption keys a set of APIs to make selected functions available to applications |
| Audit Trail System | Component that supports non-refutable protocol logging of data access including endpoint and SQL access to various components along the data access path. |

One aspect of some embodiments is that the client computer 10 communicates with the data access module 110 via the REST API 105. The data access module represents a central component of the system 100 and essentially organizes the response to requests that are issued by the client computer 10. In the exemplary embodiment described, there are database connection modules or database proxies between the REST API 105 and the data access module 110. These can be used to forward queries to the data access module 110 in a target database-specific manner (cf. the relational database 30 or the SQL database or the hash database 40). In the exemplary embodiment shown, the left module is an SQL-specific database connection module 140 and the right component is a database connection module for non-SQL target databases.

In FIG. 2, it is illustrated by way of example that the data queries originally do not come from the client computer 10 but from applications running on it.

In some embodiments, an application is configured to communicate with an appropriate target database via an ODBC interface. As already explained, according to some embodiments the client computer 10 has a database driver 12 which translates a submitted SQL request into a REST request. To do this, the addressed table name is parsed from the request and specific field information is resolved. Unspecific field information, such as a wildcard symbol ("*") can also be translated into individual field names, as long as the target database is known. Also the SQL-typical conditions that are set for a specific request (keyword: "WHERE") can be translated. Essentially, the database driver 12 generates a REST request from the SQL query and sends this REST request to the system 100 via the interface 105. The query is processed there, among other things, by the data access module 110.

The data access module 110 selects a target database, in the example the relational database 30, for example on the basis of the data provided by the database connection module 140.

In some embodiments, the data access module 110 also determines the extent to which original data or partially anonymised data can be provided in response to the request. For example, a specific role within the system 100 can be assigned to the requesting application on the client computer 10 on the basis of identification information. This role may be associated with a particular relational database 30 view.

Figure 3:
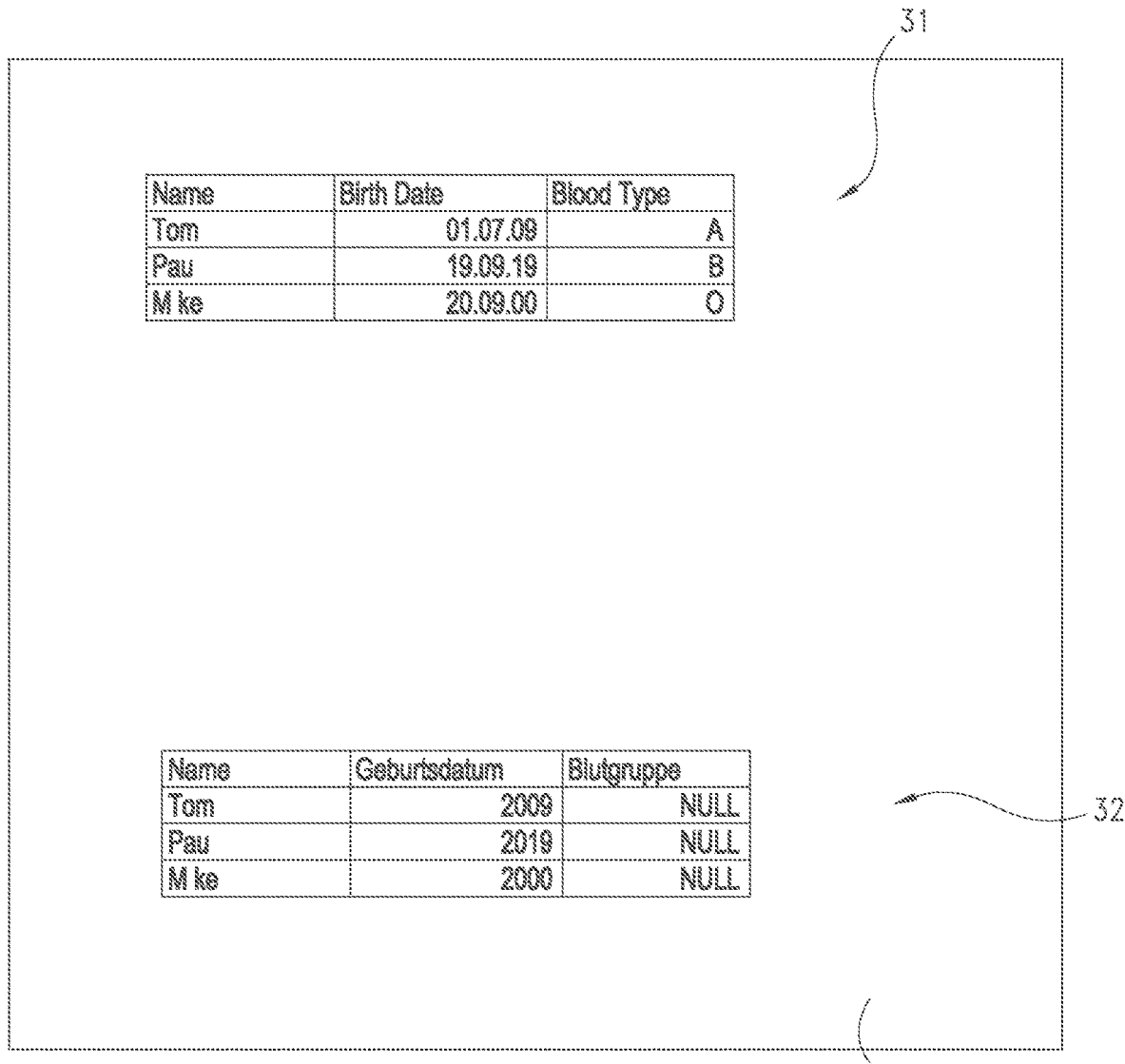
FIG. 3 shows a schematic representation of differently anonymised data according to some embodiments.

FIG. 3 shows two different views, namely a complete database view 31 and an at least partially anonymised database view 32. By way of example, the tables or views shown can be patient data. While in the full database view 31 the name, exact date of birth and blood group are given, the anonymised database view 32 only has a year of birth and no information about the blood group in addition to the name. The blood type was simply set to a null value ("NULL") to generate the anonymised database view 32.

Upon selection of one of these views, the appropriate data may be returned from the data access module 110 to the application on the client computer 10 via the REST API 105. In this respect, it is easily possible to provide data in a clearly structured and anonymised form.

The approach shown in FIG. 3 by means of various views has the advantage that data sets only have to exist once in the relational database 30 and the necessary anonymisation functions are carried out online when querying the data sets.

A distinctly different approach can be used for the non-SQL based databases. Using the hash database 40 as an example, it is possible to create copies of an original hash database and to permanently overwrite certain values there. As such, depending on the assigned role, for a query directed to the hash database 40, the data access module 110 will select the hash database associated with the user role of the querying application. This approach has the advantage that high performance is achieved.

In the exemplary embodiment described, both approaches are pursued in parallel depending on the technical implementation of the respective target database. According to some embodiments, however, it is also conceivable to implement only one of these approaches in a system 100.

In some embodiments, the system 100 comprises a data collection context module 150. This data collection context module can be configured to collect data and store it in the target databases, for example in the relational database 30 or in the hash database 40. As part of this collection process, additional information identifying the context of data collection may be stored. A separate database can be provided for this purpose. The context data or data collection context can comprise:

- a unique identifier of a data collection context
- a scope of data collection
- a purpose of data collection
- a duration of data collection
- a legal basis for data collection
- applicable data protection compliance regulations This context data can be used to determine the initially necessary anonymisation steps for the stored data. In addition, the content of the target databases can be changed depending on the time sequence. For example, it is conceivable that certain data can only be kept for a certain time period. In this respect, the system 100 according to some embodiments allows data to be deleted based on the context at a specific point in time. In addition or as an alternative, it can be provided that specific data can be made available to the general public or specific applications after a specified point in time. In this respect, it is not absolutely necessary for the degree of anonymisation to increase over time. Theoretically, scenarios are also conceivable in which there is less anonymisation information at a later point in time.

The mechanisms described are also not restricted to purely temporal information. For example, context can indicate the purpose for which certain data was collected and thus influence which access roles are authorized to query certain data.

All patents, patent applications, publications, and descriptions mentioned herein are incorporated by reference in their entirety. None is admitted to be prior art.

REFERENCE SIGNS

1 Internet
10 Client computer
12 Database driver
30 Relational database
31 Complete database view
32 Anonymised database view
40 Hash database
100 System
105 REST API
110 Data Access Module
120 Configuration Management Module
130 Authentication Module
140 Database Connection Module
150 Data Collection Context Module

The invention claimed is:

1. A system for securely storing data, comprising:
an interface configured with a representational state transfer (REST) application programming interface (API);
at least one target database for storing data;
at least one database driver configured to communicate with the interface;
a computer-readable memory containing instructions; and
at least one processing unit configured to execute the instructions to cause the system to:

a) receive a request from at least one of a client computer or a user via the interface;
b) query data from the at least one target database in response to the request;
c) determine whether the at least one of the client computer or the user has permission to query; and
d) generate a response data set to respond to the request and transmit it to the client computer, wherein a subset of the response data set is anonymised based on determining that the permission is restricted;
wherein the at least one database driver is configured to cause at least one of:
the system to receive a character string with a database expression, extract a field name from the database expression, and create a query for transmission to the interface using the field name, or
the system to encapsulate the database expression in a REST request and output the REST request on the interface.

2. The system according to claim 1, wherein the at least one target database is a distributed target hash database.

3. The system according to claim 1 wherein the at least one database driver comprises at least one of an ODBC or a JDBC driver.

4. The system according to claim 1, wherein the database expression is an SQL expression or a non-SQL expression.

5. The system according to claim 1, further comprising:
a database, which stores a plurality of accounts representing at least one of a role or a user, wherein individual accounts of the plurality of accounts are assigned respective permissions, and wherein the instructions further cause the system to receive at least a selection of requests via the interface to assign at least one role or user from the database and, based on an assigned respective permission, to determine data transmitted via the interface in response to the request.

6. The system according to claim 1, wherein the instructions further cause the system to:
generate and store a view for at least one target table, wherein the view is configured based at least in part on permissions such that values from the at least one target table are replaced with anonymised values.

7. The system according to claim 1, wherein the instructions further cause at least one of:
the system to select the at least one target database from a plurality of target databases for requests on the interface, which contains the data to respond to the request, or
the system to:
a) assign at least one of a role or a user to the request;
b) determine whether the at least one target database is a relational database; and
c) in response to determining that the at least one target database is a relational database, use at least one of the role or information about the user to select a view from a plurality of views to be used to respond to the request.

8. The system according to claim 1, wherein the instructions further cause the system to:
generate and store a role-specific copy of the at least one target database in a form of a copy hash database, wherein the copy hash database is changed based on permissions associated with at least one of a user or a role, so that selective values from the database are replaced with anonymised values.

9. The system according to claim 1, wherein the instructions further cause at least one of:
the system to select the at least one target database from a plurality of target databases for requests on the interface, which contains the data to respond to the request or
the system to:
a) assign at least one of a role or a user to the request;
b) determine whether the at least one target database is a hash database; and
c) in response to determining that the at least one target database is a hash database, use the role or information about the user to select a copy hash database from a plurality of copy hash databases to be used to respond to the request.

10. The system according to claim 1, wherein the instructions further cause the system to:
store data collection context for a selection of data sets on the at least one target database, the data collection context comprising one or more of a time of data collection, an objective of the data collection, a data retention period, a legal basis for the data collection, or details of associated retention policies.

11. The system according to claim 10, wherein the instructions further cause the system to select data based on the data collection context and to store the selected data in an anonymised form.

12. The system according to claim 1, wherein:
a subset of the at least one target database is encrypted, and wherein the instructions further cause the system to receive a security token from the client computer and, based on the security token, determine whether the client computer issuing the query is authorised to at least one of communicate with the system or receive the queried data.

13. The system according to claim 12, further comprising:
a key database, wherein the instructions further cause the system to use the key database to select a key which is used to decrypt encrypted data from the at least one target database.

14. A computer-implemented method for responding to at least one request with a response data set, comprising:
a) receiving at least one request from at least one of a client computer or user via an interface through a representational state transfer REST application programming interface (API);
b) querying data from at least one target database in response to the at least one request;
c) determining whether the at least one of the client computer or the user has permission to query; and
d) transmitting at least one response data set to respond to the at least one request, wherein a subset of the response data set is anonymised in response to determining that the at least one of the client computer or the user has restricted permission; and at least one of:
e) receiving a character string with a database expression, extracting a field name from the database expression, and creating a query for transmission to the interface the field name; or
f) encapsulating the database expression in a REST request and outputting the REST request on the interface.

15. A non-transitory computer-readable medium containing instructions for causing the computer-implemented method of claim 14 to be executed on at least one processing unit.

* * * * *